(12) United States Patent
Kumar et al.

(10) Patent No.: US 10,114,266 B2
(45) Date of Patent: Oct. 30, 2018

(54) ELECTROACTIVE OPTICAL DEVICE

(71) Applicant: PPG Industries Ohio, Inc., Cleveland, OH (US)

(72) Inventors: Anil Kumar, Murrysville, PA (US); Truman Wilt, Clinton, PA (US); Peter L. Votruba-Drzal, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/656,868

(22) Filed: Mar. 13, 2015

(65) Prior Publication Data

US 2015/0261056 A1   Sep. 17, 2015

Related U.S. Application Data

(60) Provisional application No. 61/952,913, filed on Mar. 14, 2014.

(51) Int. Cl.
*G02F 1/153* (2006.01)
*G02F 1/15* (2006.01)
*G02F 1/155* (2006.01)

(52) U.S. Cl.
CPC ...... *G02F 1/155* (2013.01); *G02F 2001/1557* (2013.01); *G02F 2202/043* (2013.01)

(58) Field of Classification Search
USPC ........ 359/242, 247, 265, 266, 267, 268, 273
See application file for complete search history.

(56) References Cited

U.S. PATENT DOCUMENTS

| | | | |
|---|---|---|---|
| 4,902,108 A | 2/1990 | Byker | |
| 6,020,987 A | 2/2000 | Baumann et al. | |
| 7,256,921 B2 | 8/2007 | Kumar et al. | |
| 8,373,919 B2 | 2/2013 | Foller et al. | |
| 2005/0012998 A1 | 1/2005 | Kumar et al. | |
| 2006/0018001 A1 | 1/2006 | Kojima et al. | |
| 2006/0262377 A1* | 11/2006 | Kojima | G02F 1/155 359/265 |
| 2007/0128437 A1* | 6/2007 | Wilderbeek | D01D 5/426 428/375 |
| 2009/0204207 A1* | 8/2009 | Blum | G02C 7/08 623/4.1 |
| 2013/0082220 A1* | 4/2013 | Herold | C07C 323/12 252/585 |

FOREIGN PATENT DOCUMENTS

| | | | | |
|---|---|---|---|---|
| JP | 61-241732 | * | 4/1985 | ............ G02F 1/17 |
| JP | 2012510649 A | | 5/2012 | |
| WO | 2011024699 A1 | | 3/2011 | |
| WO | WO 2016/077431 | * | 5/2016 | ............ G02C 7/101 |

OTHER PUBLICATIONS

Anderson et al., "Switchable optical polarizer based on elecrochromism in stretch-aligned polyaniline", Applied Physics Letters, vol. 83, No. 7, pp. 1307-1309, Aug. 18, 2003.

* cited by examiner

*Primary Examiner* — Brandi Thomas
(74) *Attorney, Agent, or Firm* — The Webb Law Firm

(57) ABSTRACT

The present invention provides an electroactive optical device including an optical substrate having two opposing surfaces; at least two electrodes spaced one from the other and disposed on the surface of the substrate; and at least one electroactive material layer in contact with the at least two electrodes and the surface of the substrate. The electroactive optical device has variable light transmittance in response to the magnitude of an applied electrical voltage.

9 Claims, No Drawings

ELECTROACTIVE OPTICAL DEVICE

CROSS REFERENCE TO RELATED APPLICATION

This application claims the benefit of priority of U.S. Provisional Application No. 61/952,913, filed Mar. 14, 2014, which is incorporated by reference herein in its entirety.

FIELD OF THE INVENTION

The present invention is directed to an electroactive optical device such as an electrochromic and/or electrochromic-dichroic device.

BACKGROUND OF THE INVENTION

Electrochromic materials include those materials that change color in a persistent but reversible manner via an electrochemical reaction, i.e., generally having at least one colored state and at least one bleached or substantially colorless state.

Electrochromic devices, such as electrochromic eyeglasses, windows or shutter-type devices are well known in the art. Typically such devices are constructed such that the electrochromic material is sandwiched between two optically transparent substrates, e.g., glass or polymeric substrates. The surfaces of the substrate material in contact with the electrochromic material typically are provided with a layer of conductive material, such as indium tin oxide, which is in electrical communication with a voltage source. When the voltage is applied, current flowing through the electrochromic material induces an electrochemical reaction which results in coloration which reverses back to the initial clear or bleached state upon cessation of the voltage application.

SUMMARY OF THE INVENTION

The present invention is directed to an electroactive optical device comprising: (a) an optical substrate having two opposing surfaces; (b) at least two electrodes spaced one from the other and disposed on the surface of the substrate; and (c) at least one electroactive material layer in contact with the at least two electrodes (b) and the surface of the substrate (a), wherein the electroactive optical device has variable light transmittance in response to the magnitude of an applied electrical voltage.

DETAILED DESCRIPTION OF THE INVENTION

As used in this specification and the appended claims, the articles "a", "an", and "the" include plural references unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

All numerical ranges herein include all numerical values and ranges of all numerical values within the recited ranges. Further, the numerical ranges and parameters setting forth the broad scope of the invention are approximations as discussed herein. It should be understood, however, that such numerical values inherently contain certain errors resulting from the measurement equipment and/or measuring technique.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

As previously mentioned, the present invention provides an electroactive optical device comprising: (a) an optical substrate having two opposing surfaces; (b) at least two electrodes spaced one from the other and disposed on the surface of the substrate; and (c) at least one electroactive material layer in contact with the at least two electrodes (b) and the surface of the substrate (a), wherein the electroactive optical device has variable light transmittance in response to the magnitude of an applied electrical voltage.

Optical Substrate

The optical substrate (a) can be comprised of any of a wide variety of substrates suitable for use in optical devices. For example, the substrate can comprise glass such as fused silica and fused quartz. Such glass substrates can include, for example, alkali-aluminosilicate glass such as that used as touch screens for hand-held electronic devices.

Further, the optical substrate can be comprised of polymeric substrate materials. Suitable polymeric substrates can include, without limitation, polycarbonate, polystyrene, polyurethane, polyurethane(urea), polyester, polyacrylate, polymethacrylate, poly(cyclic) olefin, polyepoxy, copolymers thereof, or mixtures of any of the foregoing. The polymeric substrates can comprise a combination of any of the foregoing substrates, for example, in the form of a multilayer laminate. The polymeric substrates can be formed by any manufacturing means known in the art such as by casting or molding, e.g., injection molding, techniques. In a particular embodiment of the present invention the polymeric substrate comprises polycarbonates, poly(cyclic) olefins, polystyrenes, polyurethanes, polymethacrylates, copolymers of any of the foregoing materials, or mixtures of any of the foregoing.

Additionally, the optical substrate (a) can comprise a polymeric film (i.e., a thin but self-supporting polymeric film) such as those know for use in the manufacture of optical devices. Suitable examples of such polymeric films can include any of a variety of thermoset and thermoplastic materials provided the material is transparent or optically clear. For example, the polymeric film can comprise polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), poly(ethylene naphthalate), polyester, polysulfone, polyolefin, copolymers thereof, or combinations of said films, e.g., in multilayer or laminate constructions.

The optical substrate (a) can include untinted substrates, tinted substrates, photochromic substrates, tinted-photochromic substrates, and linearly polarizing substrates.

It should be understood that the surface of the optical substrate to which the at least two electrodes (b) are applied or affixed can be a flat surface or a surface having a curvature (i.e., it can be concave or convex).

Electrodes

As previously mentioned, the electroactive optical device of the present invention comprises at least two electrodes (b) spaced one from the other and disposed on at least one surface of the optical substrate (a), which may be a flat planar surface, or a surface having a curvature as previously mentioned. The electrodes typically are comprised of a transparent conductive material such as any of those discussed herein below. The transparent conductive material used to form the electrodes can be applied directly onto the substrate surface, or it may be applied to the surface of one or more coating layers, e.g., barrier coating layers, adhesion promoting layers, and/or primer layers, which had previously been applied to the substrate surface. Any type of barrier coatings, primer coatings or adhesion promoting layers known in the art of optical devices can be applied to the substrate surface if desired provided the overall optical properties of the device are not adversely affected by such application. Of course, these intervening coatings are conformal with the substrate surface.

Further, it should be noted that the transparent conductive material used to form the electrodes is applied to the substrate surface such that the electrodes conform to the surface topography. For example, if the substrate surface is a flat planar surface, the electrodes are "in-plane" with and disposed, either directly on the flat planar surface, or onto the surface of one or more of the aforementioned coatings which are interposed between the electrodes and the substrate surface. Alternatively, if the substrate surface is a surface having a curvature, then the electrodes conform to the curvature and are disposed either directly on the curved surface, or onto the surface of one or more of the aforementioned conformal coatings which are interposed between the electrodes and the curved substrate surface.

The transparent conductive material used to form the electrodes can be applied by a variety of patterning techniques known in the art. Suitable techniques can include, but are not limited to, lithography (including, inter alia, contact photolithography, microscope projection photolithography, and microlens array reduction photolithography), silk printing, etching roll-to-roll processes, and ink jet printing techniques. A combination of any of the aforementioned techniques also is contemplated. The transparent conductive materials can be applied, for example, by chemical vapor deposition, spray pyrolysis, pulsed laser deposition, metal organic molecular beam deposition, sputter deposition, chemical assisted vapor deposition, aerosol assisted vapor deposition, metal organic chemical vapor deposition, magnetron sputtering, field assisted magnetron sputtering, pulsed direct current sputtering, and the like.

The transparent conductive materials can be applied in multilayers or "stacks" of conductive materials to form the at least two electrodes (b), e.g., the electrode can comprise a stack of conductive materials applied in succession such as indium tin oxide/silver/indium tin oxide.

In many cases the patterning techniques selected for the transparent conductive material used to form the electrodes on the surface of the substrate will be dependent upon the particular substrate employed. Obviously, the use of polymeric substrates would require patterning techniques that do not demand high processing temperatures.

The present invention contemplates that the patterning of the transparent conductive materials to form the at least two electrodes includes the formation of bus bar patterns on the substrate.

The electrodes are spaced one from the other so as to prevent shorting (i.e., a short circuit) during operation of the device. Any pattern may be used to form the electrodes provided that upon application of voltage (1) there is no shorting, and (2) there is sufficient current flowing through the electroactive material in contact with the electrodes to effectuate the desired electroactive response.

The conductive material used to form the at least two electrodes can be selected, for example, from any of those widely known in the field of electrochromic devices. Non-limiting examples of transparent conductive materials can include those selected from carbon nanotubes, graphene platelets, gold, tin oxide, fluorine-doped tin oxide, indium tin oxide, and/or one or more conductive polymers. The foregoing conductive materials may be present in polymeric coatings, where applicable, which are patterned to form the at least two electrodes (b). Non-limiting examples of suitable conductive polymers can include poly(acetylene), poly (pyrrole), poly(thiophene), poly(aniline), poly(fluorene), poly(pyridene), poly(indole), poly(carbazole), poly(azine), poly(quinone), poly(3-alkylthiophene), polytetrathiafulvalene, polynaphthalene, poly(p-phenylene sulfide), and/or poly(para-phenylene vinylene). For a detailed discussion of suitable conductive polymers, see Handbook of Conducting Polymers, $2^{nd}$ ed., rev'd., Marcel Dekker, Inc., New York 1998.

Electroactive Materials

Electrochromic Materials

As previously mentioned, the electroactive optical device of the present invention further includes at least one electroactive material layer (c) in contact (either directly or through one or more intervening layers) with the at least two electrodes (b) described above and the surface of the substrate (a) upon which the electrodes are disposed. The electroactive material layer can be in the form of a polymeric coating layer which comprises an electroactive material, or in the form of a gel which comprises an electroactive material.

The electroactive material layer (c) can comprise an electrochromic material (which includes electrochromic-dichroic materials). The electrochromic material used to form the electroactive material layer (c) can comprise any of the electrochromic compounds known in the art, including, for example, phenazine compounds, such as dihydrophenazine compounds, and/or dipyridinium (i.e., viologen) compounds. Suitable non-limiting examples of such phenazine compounds and the preparation thereof can include those described in U.S. Pat. No. 6,020,987 at column 31, line 43, column 34, line 7, and in U.S. 4,902,108 at column 13, line 49 to column 15, line 42, the cited portions of which are incorporated herein by reference. Suitable non-limiting examples of viologen compounds include those described in U.S. Pat. No. 6,020,987 at column 34, line 8-55, incorporated herein by reference. See also, Electrochromism and Electrochromic Devices, Monk et al., Cambridge University Press 2007, Chapter 11, pp. 341-373, incorporated by reference herein in its entirety. Specific examples of suitable anodic electrochromic dyes can include but are not limited to 5,10-dihydro-5,10-dimethylphenazene, N,N,N,N'-tetramethyl-1,4-phenylenediamine, 10-methylphenothiazine, 10-ethylphenothiazine, tetrathiafulvalene, ferrocene and derivatives thereof, and/or triarylamines and derivatives thereof. Specific examples of suitable cathodic electrochromic dyes can include but are not limited to 1,1'-diphenyl-4,4'-bipyridinium difluoroborate, 1,1'-di(n-heptyl)-4,4'bipyridinium difluoroborate, 1,1'-dibenzyl-4,4'bipyridinium defluoroborate, and/or 1,1'-di(n-propylphenyl)-4,4'-bipyridinium difluoroborate. Additionally, the electrochromic materials can include certain Prussian blue systems as well as conductive polymers such as poly(thiophenes) such as poly(3,4-ethylenedioxythiophene) often referred to as "PEDOT."

In addition, the electrochromic material also may include other materials such as solvents (e.g., polar aprotic solvents), light absorbers, light stabilizers, thermal stabilizers, antioxidants, thickeners or viscosity modifiers (e.g., polyvinylpyrrolidone), and free standing gel, including polymer matrices. The electrochromic material can include a solvent, where appropriate. For example, suitable solvents can include propylene carbonate, benzonitrile, phenoxyacetonitrile, diphenyl acetonitrile, sulfolane, sulfolate, and/or phosphoramide Other useful solvents can include, but are not limited to, phosphoric esters such as tricresyl phosphate, cresyl phosphate and the like, amides such as N,N-di-methylformamide, methylpropionamide, N-methylpyrrolidone, hexamethylphosphonamide, diethylformamide, tetramethylurea and the like, nitriles such as acetonitrile, sulfoxides such as dimethylsulfoxide, esters such as ethyl acetate, butyl acetate, dioctyl phthalate and the like, carbonates such as propylene carbonate, ethylene carbonate and the like, lactones such as .gamma.-butyrolactone, ketones such as methyl ethyl ketone, methyl isobutyl ketone and the like. Any of the aforementioned solvents maybe used singly or in any combination. Additionally, the electrochromic material also can comprise an electrolyte, for example, tetrabutylammonium tetrafluoroborate and/or tetrabutylammonium bromide to provide ionic conductivity to the material. Electrolyte materials suitable for this purpose are well known in the art.

The electrochromic material also can comprise metal oxides such as, for example, $WO_3$, $MoO_3$, $V_2O_5$, $Nb_2O_5$ and the like. Deposition of such materials typically requires vacuum evaporation, sputtering, or other vapor deposition processes. The electrochromic process in metal oxides involves the electrochemical switch to a non-stoichiometric redox state that corresponds to an electrochromic absorption band due to optical intervalence charge transfer.

The electrochromic material also can comprise a class of materials such as conjugated polymers and copolymers that are capable of accessing multiple redox states. Termed pi-conjugated organic polymers, these systems provide mechanical flexibility, and easily tuned band-gap color via structural and functionality control. Such pi-conjugated polymers and copolymers are described in Beaujuge, P. M. and J. R. Reynolds, *Color Control in pi-conjugated Organic Polymers for Use in Electrochromic Devices*, Chemical Reviews, 2010, 110(1): pp. 268-320, the cited portions of which are incorporated by reference herein.

Dichroic and Alignment Materials:

In addition to the aforementioned electrochromic material, the electroactive material layer can also comprise a dichroic material. As used herein the term "dichroic" means capable of absorbing one of two orthogonal plan polarized components of at least transmitted radiation more strongly than the other. Non-limiting examples of suitable dichroic materials can include, but are not limited to, compounds such as azomethines, indigoids, thioindigoids, merocyanines, indans, quinophthalonic dyes, perylenes, phthaloperines, triphenodioxazines, indoloquinoxalines, imidazotriazines, tetrazines, azo and (poly)azo dyes, benzoquinones, naphthoquinones, anthroquinone, (poly)anthroquinones, anthropyrimidinones, iodine, and/or iodates. As used herein the term "compound" means a substance formed by the union of two or more elements, components, ingredients, or parts and includes, without limitation, molecules and macromolecules (for example polymers and oligomers) formed by the union of two or more elements, components, ingredients, or parts. The dichroic material also can comprise a polymerizable dichroic compound. That is, the dichroic material can comprise at least one group that is capable of being polymerized (i.e., a "polymerizable group"). For example, although not limiting herein, the dichroic compound can have at least one alkoxy, polyalkoxy, alkyl, or polyalkyl substituent terminated with at least one polymerizable group.

The dichroic material also can comprise a photochromic-dichroic compound. The term "photochromic-dichroic" means displaying both photochromic and dichroic (i.e., linearly polarizing) properties under certain conditions, which properties are at least detectible by instrumentation. Accordingly, "photochromic-dichroic compounds" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation, and are capable of absorbing one of two orthogonal plane polarized components of at least transmitted radiation more strongly than the other (i.e., capable of exhibiting dichroism. Additionally, as with conventional photochromic compounds the photochromic-dichroic compounds disclosed herein can be thermally reversible. That is, the photochromic-dichroic compounds can switch from a first state to a second state in response to actinic radiation and revert back to the first state in response to thermal energy.

For example, according to various non-limiting embodiments disclosed herein, the photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Examples of photochromic-dichroic compounds suitable for use in the present invention can include, but are not limited, to those described in detail in U.S. Patent Application Publication No. 2005/0012998A1 at paragraphs [0089] to [0339], which disclosure is incorporated herein by reference.

It should be noted that while dichroic materials are capable of preferentially absorbing one of two orthogonal plan polarized components of transmitted radiation, if the molecules of the dichroic material are not suitably position (i.e., oriented), no net linear polarization of transmitted radiation will be achieved. That is, due to the random positioning of the molecules of the dichroic material, selective absorption by the individual molecules will cancel each other such that no net or overall linear polarizing effect is achieved. Therefore, it generally is necessary to suitably position or arrange the molecules of the dichroic material by alignment with another material in order to achieve a net linear polarization.

In a further embodiment of the present invention, the electroactive material layer comprises and electroactive-dichroic material (which may be a single compound which is both electrochromic and dichroic is response to an applied voltage), or a mixture of an electrochromic material and a dichroic material). Suitable electrochromic-dichroic materials can include, but are not limited to, stretched polyaniline film, stretched polypyrrol, stretched polythiophene, structurally modified and oriented electrochromic materials such as viologens, dichroic dyes in liquid crystal, etc.

In such embodiments, the electroactive material layer may further comprise an anisotropic material. For purposes of the present invention, "anisotropic material" is a material that has at least one property that differs in value when measured in at least on different direction. Non-limiting examples of anisotropic materials suitable for use in the electroactive optical device of the present invention can include any of a variety of liquid crystal materials. Suitable examples of such liquid crystal materials are disclosed in detail in U.S. Pat. No. 7,256,921 B2, at column 68, line 8 to column 69, line 33, the cited portions of which are incorporated by reference herein.

Also, the electroactive optical device of the present invention may further comprise an alignment (or orientation facility) to facilitate orientation or alignment of the dichroic material and/or the anisotropic material to effectuate linear polarization. As used herein, the term "alignment facility" is used interchangeably with the term "orientation facility." An alignment facility (or orientation facility) is a mechanism that can facilitate the positioning (in a desired direction or order) of one or more other structures that are exposed, directly and/or indirectly to at least a portion thereof. Suitable alignment/orientation facilities can include, but are not limited to those described in detail in U.S. Pat. No. 7,256,921B2, at column 67, line 7 to column 71, line 65, the cited portions of which are incorporated by reference herein.

Additional Coating Layers

The electroactive optical device of the present invention can further comprise one or more protective coatings, such as hard coats and/or abrasion-resistant coatings, anti-reflective ("AR") coatings, antifogging coatings, oxygen barrier coatings and/or infra-red (IR) absorbing coatings and/or IR reflective coatings, and/or conventional reflective coatings. Note that the coatings can, but need not, cover an entire surface of the electroactive material layer (c), and/or the surface of the optical substrate (a) which is opposite the surface comprising the electroactive layer (c) and the electrodes (b).

Suitable non-limiting examples of AR coatings can include a monolayer coating or multi-layer coating of metal oxides, metal fluorides, or other such materials, which may be deposited onto the outer surface(s) of the substrates (i) and/or (ii) or, alternatively onto self-supporting films that are applied to the substrate outer surface(s), through application means such as vacuum deposition and sputtering techniques as are well known in the art. Suitable non-limiting examples of IR reflective coatings can include very thin, partially transparent metallic layers such as NiCr and/or or gold layers applied, for example, by PVD metallization methods. Such materials and application means are available from Creavac Vakuumbeschechtung GmbH of Dresden, Germany. Suitable examples of IR reflective coatings (e.g., Laser Gold and Laser Black) also are available from Epner Technology, Inc. Also, suitable IR reflective coatings can include the silver-based coatings available under the tradename AgHT™, and the gold-based coating available under the tradename AuARE™, from CPFilms Inc. of Canoga Park, Calif. Suitable non-limiting examples of IR absorbing coatings are coatings which comprise IR absorbing dye materials, for example, those which are photochemically stable under ambient light conditions, and which absorb light within the near-IR region of the spectrum, for example, 5,5'-dichloro-11-diphenylamino-3,3'-diethyl-10,12-ethyl-enethiatricarbocyanine perchlorate (which provides peak IR absorption at about 830 nm); 2,4 di-3-guaiazulenyl-1,3-dihydroxycyclobutenediylium dihydroxide, bis(inner salt) (which provides peak IR absorption about 780 to about 800 nm); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate (which provides peak IR blocking at about 900 to about 1000 nm).

Transitional coatings may also be employed. As used herein the term "transitional coating" means a coating that aids in creating a gradient in properties between two coatings. For example, although not limiting herein, a transitional coating can aid in creating a gradient in hardness between a relatively hard coating and a relatively soft coating. Examples of transitional coatings include radiation-cured acrylate-based thin films.

Suitable examples of protective coatings can include, but are not limited to, abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coating, UV-shielding coatings, and combinations thereof. For example, the protective coating can comprise a first coating of a radiation-cured acrylate-based thin film and a second coating comprising an organo-silane. Non-limiting examples of commercially available protective coating products include SILVUE® 124 and HI-GARD® coatings, available from SDC Coatings, Inc. and PPG Industries, Inc., respectively.

The electroactive optical device of the present invention also can comprise additional coating layers interposed between any of the substrate (a) surface and the at least two electrodes (b), or the at least two electrodes (b) and the electroactive layer (c) provided, however, that the electrodes remain in electrical communication with the electroactive layer (c). Any of the aforementioned coatings can be used for this purpose, as well as barrier coatings and/or primer layers.

As discussed above, the electroactive optical device of the present invention has a variable light transmittance in response to the magnitude of an applied voltage. Generally, the at least two electrodes (formed from transparent conductive material) disposed on the surface of the optical substrate (a) serve as counter-conducting electrodes in electrical communication with a controller which is operable to energize the electroactive material layer by applying an electrical voltage thereto.

Upon application of an applied voltage, the electroactive material layer reversibly changes from a first absorption state to a second absorption state. The first absorption state has essentially no absorption in the visible spectral region, i.e., between 410 nm and 800 nm.

The electroactive optical device is useful as or in the production of optical articles such as optical lenses, including ophthalmic (prescription) and piano (non-prescription), contact lenses, intra-ocular lenses, magnifying lenses, protective lenses and visors, display articles (including, for example, touch screens and security elements), windows, mirrors, and both active and passive liquid crystal cells.

Whereas particular embodiments of this invention have been described above for purposes of illustration, it will be evident to those skilled in the art that numerous variations of the details of the present invention may be made without departing from the invention as defined in the appended claims.

Therefore, we claim:

1. An electroactive optical device comprising:
   (a) an optical substrate having two opposing surfaces;
   (b) at least two electrodes spaced one from the other and disposed on the surface of the substrate;
   (c) at least one electroactive material layer in contact with the at least two electrodes (b) and the surface of the substrate (a) wherein the electroactive material layer comprises at least one electrochromic-dichroic material which is a single compound which is both electrochromic and dichroic in response to an applied voltage, and
   wherein the electroactive optical device has variable light transmittance in response to the magnitude of an applied electrical voltage.

2. The electroactive optical device of claim 1, wherein the at least two electrodes (b) are comprised of a transparent conductive material.

3. The electroactive optical device of claim 1, wherein upon application of an applied voltage, the electroactive material layer reversibly changes from a first absorption state to a second absorption state.

4. The electroactive optical device of claim 3, wherein the first absorption state has essentially no absorption in the visible spectral region.

5. The electroactive optical device of claim 1, wherein the electroactive material layer further comprises at least one electrochromic material and/or at least one dichroic material.

6. The electroactive optical device of claim 5, wherein the electroactive material layer further comprises an anisotropic material.

7. The electroactive optical device of claim 1, further comprising an alignment facility, and wherein the electrochromic-dichroic material is at least partially aligned.

8. The electroactive optical device of claim 1, wherein the electroactive material layer is in the form of a polymeric coating layer or a polymeric gel layer.

9. The electroactive optical device of claim 1, further comprising one or more protective coating layers applied to the electroactive material layer (c), and/or the surface of the optical substrate (a) which is opposite the surface comprising the electroactive layer (c) and the electrodes (b).

* * * * *